US010044268B1

(12) United States Patent
Lidsky et al.

(10) Patent No.: US 10,044,268 B1
(45) Date of Patent: Aug. 7, 2018

(54) DEVICES AND TECHNIQUES FOR CONTROLLING VOLTAGE REGULATION

(71) Applicant: Empower Semiconductor, Inc., Fremont, CA (US)

(72) Inventors: David Lidsky, Oakland, CA (US); Timothy Phillips, Hope, RI (US); Gene Sheridan, Palos Verdes Estates, CA (US)

(73) Assignee: Empower Semiconductor, Inc., Fremont, CA (US)

( * ) Notice: Subject to any disclaimer, the term of this patent is extended or adjusted under 35 U.S.C. 154(b) by 0 days.

(21) Appl. No.: 14/731,237

(22) Filed: Jun. 4, 2015

Related U.S. Application Data

(60) Provisional application No. 62/007,683, filed on Jun. 4, 2014.

(51) Int. Cl.
    *H02M 3/00*     (2006.01)
    *H02J 1/00*     (2006.01)
    *H02M 3/158*     (2006.01)

(52) U.S. Cl.
    CPC ............ *H02M 3/158* (2013.01); *H02J 1/00* (2013.01)

(58) Field of Classification Search
    CPC .................................. H02J 1/00; H02M 3/00
    USPC .......................................................... 307/40
    See application file for complete search history.

(56) References Cited

U.S. PATENT DOCUMENTS

| | | | | |
|---|---|---|---|---|
| 8,179,705 | B2* | 5/2012 | Chapuis | H02J 1/08 323/266 |
| 2006/0015616 | A1* | 1/2006 | Chapuis | G06F 1/26 709/225 |
| 2006/0156415 | A1* | 7/2006 | Rubinstein | G06F 21/445 726/27 |
| 2008/0052551 | A1* | 2/2008 | Chapuis | G06F 1/26 713/340 |
| 2008/0238393 | A1* | 10/2008 | Potter | G06F 1/26 323/283 |

(Continued)

OTHER PUBLICATIONS

E. Burton et al., "FIVR—Fully integrated voltage regulators on 4th generation Intel(R) Core(TM) SoCs," Applied Power Electronics Conference and Exposition (APEC), Mar. 2014, pp. 432-439.

(Continued)

*Primary Examiner* — Adi Amrany
(74) *Attorney, Agent, or Firm* — Goodwin Procter LLP

(57) ABSTRACT

Devices and techniques for controlling voltage regulation are disclosed. A voltage regulation system may include one or more loads disposed on an integrated circuit, a DC-to-DC voltage regulation device at least partially disposed on the integrated circuit, and a second device disposed external to the integrated circuit and comprising circuitry configured to communicate with the controller of the voltage regulation device. The voltage regulation device may include one or more voltage regulation modules and a controller configured to control the one or more voltage regulation modules. The one or more voltage regulation modules may be configured to supply one or more voltage levels, respectively, to the one or more loads. The controller may be configured to disable at least one of the one or more voltage regulation modules based on a determination that the second device is not suitable for use with the voltage regulation device.

19 Claims, 9 Drawing Sheets

(56) References Cited

U.S. PATENT DOCUMENTS

| | | | | |
|---|---|---|---|---|
| 2010/0219687 A1* | 9/2010 | Oh | ............................ | G05F 1/46 |
| | | | | 307/39 |
| 2011/0234000 A1* | 9/2011 | Yan | ....................... | H02M 3/157 |
| | | | | 307/31 |
| 2012/0098334 A1* | 4/2012 | Holmberg | ................. | G06F 1/32 |
| | | | | 307/12 |
| 2012/0297104 A1* | 11/2012 | Thottuvelil | ......... | G06F 13/4004 |
| | | | | 710/305 |
| 2013/0187456 A1* | 7/2013 | Bilhan | ..................... | H02J 4/00 |
| | | | | 307/28 |
| 2014/0013145 A1* | 1/2014 | Hopkins | ............... | G06F 1/3206 |
| | | | | 713/330 |
| 2014/0205092 A1* | 7/2014 | Hartley | ................. | H04L 9/0866 |
| | | | | 380/44 |
| 2016/0048147 A1* | 2/2016 | Abhishek | ................ | G05F 1/468 |
| | | | | 323/313 |
| 2016/0091939 A1* | 3/2016 | Severson | .................. | G06F 1/26 |
| | | | | 713/300 |

OTHER PUBLICATIONS

W. Kim et al., "A fully-integrated 3-level DC-DC converter for nanosecond-scale DVFS," IEEE Journal of Solid-State Circuits, vol. 47, No. 1, Jan. 2012, pp. 206-219.

* cited by examiner

DEVICES AND TECHNIQUES FOR CONTROLLING VOLTAGE REGULATION

CROSS-REFERENCE TO RELATED APPLICATION

This application claims priority and benefit under 35 U.S.C. 119(e) of U.S. Provisional Patent Application No. 62/007,683, titled "MULTI-STAGE VOLTAGE REGULATOR" and filed on Jun. 4, 2014, which is hereby incorporated by reference to the maximum extent permitted by applicable by law.

FIELD OF THE INVENTION

The present disclosure generally relates to devices and techniques for controlling voltage regulation.

BACKGROUND

DC-to-DC voltage regulators generally regulate an input DC voltage to produce an output DC voltage with a stable DC level. Examples of DC-to-DC voltage regulators include linear regulators, switching regulators, etc. The impedance of a linear regulator generally varies with the load on the regulator, resulting in a substantially constant output voltage. Switching regulators generally perform DC-to-DC voltage conversion and regulate the converted DC voltage to produce an output voltage with a stable DC level. DC-to-DC voltage conversion involves converting a DC input voltage into an output voltage with a different DC level. The DC-to-DC voltage conversion circuit of a switching DC-to-DC voltage regulator generally includes a plurality of switching devices, e.g., one or more field effect transistors (FETs), or, in the alternate, one or more FETs in combination with one or more diodes. The switching devices generally operate to provide a signal (e.g., a modulated square wave signal) that can swing from a first rail, e.g., a high supply, $V_H$, to a second rail, e.g., a low supply (ground), $V_L$, or to a voltage in between. The voltage regulation circuit of a switching DC-to-DC voltage regulator generally includes a filter. The filter provides a DC or substantially DC output voltage by smoothing the signal provided by the switching device(s).

FIG. 1 shows an example of a DC-to-DC voltage regulator 10 that produces an output voltage ($V_{OUT}$) that is less than the input voltage ($V_{IN}$). The DC-to-DC voltage regulator 10 of FIG. 1 is sometimes referred to as a synchronous buck converter. The regulator 10 includes a first switching device 12 and a second switching device 14 that are controlled by a controller 15, e.g., a device capable of controlling the switching devices 12, 14 utilizing pulse width modulation (PWM), pulse frequency modulation (PFM), or other suitable techniques. When only the first switching device 12 is activated or ON, an input voltage ($V_{IN}$) is introduced at node 11, and when only the second switching device 14, which is grounded, is activated or ON, there is zero voltage at node 11. The duty ratio (D) of the regulator 10 depends on the ON time (T1) of the first switching device 12 during a cycle and the ON time (T2) of the second switching device 14 during a cycle, and is given by the equation:

$$D = T1/(T1+T2).$$

A filter including, for example, an inductor(s) 16 (L) and output capacitor(s) 18 ($C_{OUT}$) are provided downstream of the node 11, to filter out the signal generated at node 11 and thereby produce a substantially DC output voltage ($V_{OUT}$).

Conventionally, according to the prior art, a DC-to-DC voltage regulator could be divided amongst a number of integrated circuits. For example, the controller 15 could be on one chip or die, each power FET 12, 14 could be on a separate chip or die or on separate oxide layers on the same chip, and another chip or die might have been provided to drive the FETs 12, 14. Alternatively, all of the components could be integrated on a single chip.

Multi-stage or cascading DC-to-DC voltage regulators can be implemented using circuits in which the output voltage of a first voltage regulator becomes the input voltage of a second voltage regulator. An illustrative two-stage regulator 20 is shown in FIG. 2. In the example of FIG. 2, the two-stage voltage regulator 20 includes a first voltage regulator stage 22 and a second voltage regulator stage 24. The first voltage regulator stage 22 provides a first stage output voltage 21, and the output voltage 21 of the first voltage regulator stage 22 is coupled to the input of the second voltage regulator stage 24. The second voltage regulator stage regulates its input voltage 23 to provide a second stage output voltage 29. In the example of FIG. 2, the second stage input voltage 23 is equal to the first stage output voltage 21, and the second stage output voltage 29 is also the output voltage of the two-stage voltage regulator 20.

SUMMARY OF THE INVENTION

Motivation for Some Embodiments of the Invention

It has been common practice in the field of DC to DC voltage regulation to power digital or primarily digital integrated circuits (ICs) and system on chip devices (SoCs) with external Point-of-Load (PoL) discrete regulators. These PoL regulators typically consume significant board space, have slow response times, are expensive, and/or can be difficult to coordinate and control. These problems can be alleviated, at least in part, by integrating voltage regulators into ICs or SoCs (e.g., inside the packages in multi-chip implementations or directly into the chips that the voltage regulators power. However, integrating regulators into ICs or SoCs can be challenging, because many ICs and SoCs have stringent design budgets (e.g., for chip size, manufacturing cost, etc.), operating budgets (e.g., for power consumption, heat dissipation, etc.), and/or performance requirements (e.g., for efficiency, etc.). Thus, there is a need for small, low-cost voltage regulators that can be integrated into ICs or SoCs and can operate with high efficiency, lower power consumption, and low heat dissipation.

From a technical standpoint, it would be advantageous, at least for some applications, to use a multi-stage voltage regulator capable of performing dynamic voltage scaling (DVS), and to place the regulator on chip with the regulator's load. Compared to single-stage voltage regulators, multi-stage voltage regulators may provide better tradeoffs among regulator characteristics, including size, speed, battery life, power consumption, heat dissipation, and efficiency. Some performance metrics (e.g., speed, efficiency, power consumption, and/or heat dissipation) can be further improved by using voltage regulators that perform dynamic voltage scaling (DVS). Placing the regulator on chip with the regulator's load constraints otherwise imposed by inter-chip communication, and/or enable the regulator to respond more quickly to changes in the system it is powering.

However, many designers and producers of ICs and SoCs lack the expertise needed to design high-quality voltage regulators. In theory, such chip-makers could license voltage regulator designs from voltage regulator designers, and embed those voltage regulator designs into their chips. However, many chip-makers are unwilling to pay royalties for voltage regulator designs because the payment of royalties can reduce the profit margins for their chips. Thus, there is a need for a voltage regulator that not only has the above-described characteristics, but also can be integrated into ICs or SoCs in a way that is satisfactory to both the chip-maker and the vendor of the voltage regulator (e.g., in a way that compensates voltage regulator vendors for the value of their designs, without including the cost of voltage regulator design royalties in the cost of the chip-maker's chip).

The inventors have recognized and appreciated that a multi-stage voltage regulator can include at least one stage placed on chip with the load controlled by the voltage regulator, and at least one stage placed off chip. The on-chip stage(s) may be relatively small, inexpensive, fast, and/or efficient, with relatively low power consumption and/or heat dissipation. The off-chip stage(s) may provide the voltage input to the on-chip stage(s). The voltage regulator may be designed such that on-chip stage(s) will not operate properly if the off-chip stage(s) fail to provide suitable authentication information.

The above-described voltage regulator design may permit voltage regulators to be integrated into ICs or SoCs in a way that is satisfactory to both the chip-makers and the voltage regulator vendors. In particular, a voltage regulator vendor may cheaply (or even freely) license the design of the on-chip stage(s) of the voltage regulator to a chip-maker, thereby ensuring that the voltage regulator does not significantly reduce the profit margins on the chip-maker's chips. The voltage regulator vendor can then sell chips implementing the off-chip stage(s) of the voltage regulator, thereby obtaining compensation for the voltage regulator design. Together, the off-chip stage(s) and the on-chip stage(s) may form a voltage regulator with the above-described characteristics.

SUMMARY

According to an aspect of the present disclosure, a voltage regulation system is provided, comprising: one or more loads disposed on an integrated circuit, the one or more loads implemented in one or more respective voltage domains; a DC-to-DC voltage regulation device at least partially disposed on the integrated circuit, the voltage regulation device comprising: one or more voltage regulation modules configured to supply one or more voltage levels, respectively, to the one or more loads, and a controller configured to control the one or more voltage regulation modules; and a second device disposed external to the integrated circuit and comprising circuitry configured to communicate with the controller of the voltage regulation device, wherein the controller is configured to disable at least one of the one or more voltage regulation modules based on a determination that the second device is not suitable for use with the voltage regulation device.

In some embodiments, the controller is further configured to enable at least one of the one or more voltage regulation modules based on a determination that the second device is suitable for use with the voltage regulation device. In some embodiments, the controller is further configured to disable at least one of the one or more voltage regulation modules within a predetermined time after startup of the voltage regulation device unless the controller determines that the second device is suitable for use with the voltage regulation device within the predetermined time. In some embodiments, the controller is configured to determine whether the second device is suitable for use with the voltage regulation device by: receiving data from the second device; and determining, based on the data, whether the second device is authentic. In some embodiments, the second device further comprises one or more voltage regulation modules configured to supply one or more intermediate voltage signals to the integrated circuit. In some embodiments, the controller is further configured to control at least one of the one or more voltage regulation modules of the second device to regulate the one or more intermediate voltage signals supplied by the one or more voltage regulation modules of the second device. In some embodiments, the controller is further configured to determine, based on the one or more intermediate voltage signals, whether the controller is controlling at least one of the one or more voltage regulation modules of the second device. In some embodiments, the one or more intermediate voltage signals supplied by the one or more voltage regulation modules of the second device provide power to the controller.

According to another aspect of the present disclosure, an apparatus is provided, comprising: circuitry configured to communicate with a DC-to-DC voltage regulation device, wherein the voltage regulation device is at least partially disposed on an integrated circuit and the circuitry is disposed external to the integrated circuit, wherein the voltage regulation device includes: one or more voltage regulation modules configured to supply one or more voltage levels, respectively, to one or more loads disposed on the integrated circuit and implemented in one or more respective voltage domains, and a controller configured to control the one or more voltage regulation modules, wherein the controller is configured to disable at least one of the one or more voltage regulation modules based on a determination that the circuitry is not suitable for use with the voltage regulation device.

According to another aspect of the present disclosure, a system having multi-stage DC to DC voltage regulation is provided, the system comprising: one or more loads disposed on an integrated circuit, the one or more loads implemented in one or more respective voltage domains; a first voltage regulation stage disposed external to the integrated circuit, the first voltage regulation stage comprising one or more first voltage regulation modules configured to supply an intermediate voltage to the integrated circuit; and a second voltage regulation stage at least partially disposed on the integrated circuit, the second voltage regulation stage comprising one or more second voltage regulation modules configured to use the intermediate voltage to supply one or more voltage levels, respectively, to the one or more loads, wherein the second voltage regulation stage further comprises a controller configured to control the one or more second voltage regulation modules, and wherein the controller is further configured to control at least one of the one or more first voltage regulation modules to regulate the intermediate voltage supplied by the one or more first voltage regulation modules.

In some embodiments, the first voltage regulation stage is configured to provide data to the second voltage regulation stage, wherein the second voltage regulation stage is configured to determine, based at least in part on the data, whether the first voltage regulation stage is authentic, and wherein the second voltage regulation stage is configured to determine whether the first voltage regulation stage is suitable for use with the second voltage regulation stage based at least in part on the determined authenticity of the first voltage regulation stage. In some embodiments, the controller is configured to determine, based on the intermediate voltage, whether the controller is controlling at least one of the one or more first voltage regulation modules of the first voltage regulation stage. In some embodiments, the controller is configured to disable the one or more second voltage regulation modules based on a determination that the first voltage regulation stage is not suitable for use with the second voltage regulation stage. In some embodiments, the second voltage regulation stage is configured to disable the one or more second voltage regulation modules within a predetermined time after startup of the second voltage regulation stage unless the second voltage regulation stage determines that the first voltage regulation stage is suitable for use with the second voltage regulation stage within the predetermined time. In some embodiments, the controller is configured to enable the one or more second voltage regulators based on a determination that the first voltage regulation stage is suitable for use with the second voltage regulation stage. In some embodiments, the second voltage regulation stage is configured to use the intermediate voltage supplied by the first voltage regulation stage to provide power to the controller. In some embodiments, the controller is configured to control at least one of the one or more second voltage regulation modules to perform dynamic voltage scaling.

According to another aspect of the present disclosure, a device is provided, comprising: a first voltage regulation stage including one or more first DC-to-DC voltage regulation modules configured to supply an intermediate voltage to a second voltage regulation stage, wherein the second voltage regulation stage is at least partially disposed on an integrated circuit and the first voltage regulation stage is disposed external to the integrated circuit, wherein the second voltage regulation stage includes: one or more second DC-to-DC voltage regulation modules configured to use the intermediate voltage to supply one or more voltage levels, respectively, to one or more loads disposed on the integrated circuit and implemented in one or more respective voltage domains, and a controller configured to control the one or more second voltage regulation modules, and wherein the first voltage regulation stage is configured to permit the controller to control at least one of the one or more first voltage regulation modules to regulate the intermediate voltage supplied by the one or more first voltage regulation modules.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
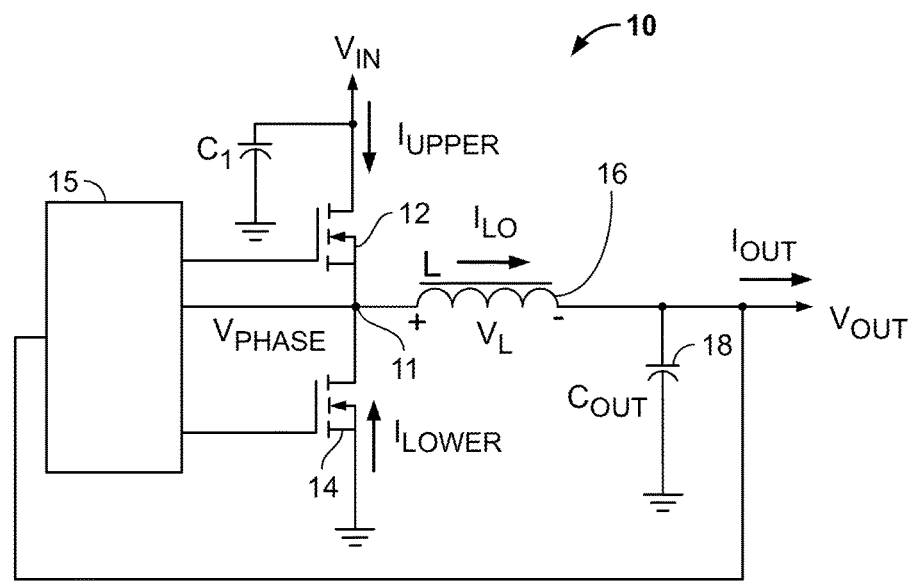
FIG. 1 shows an illustrative embodiment of a synchronous buck converter in accordance with the prior art.
Figure 3:
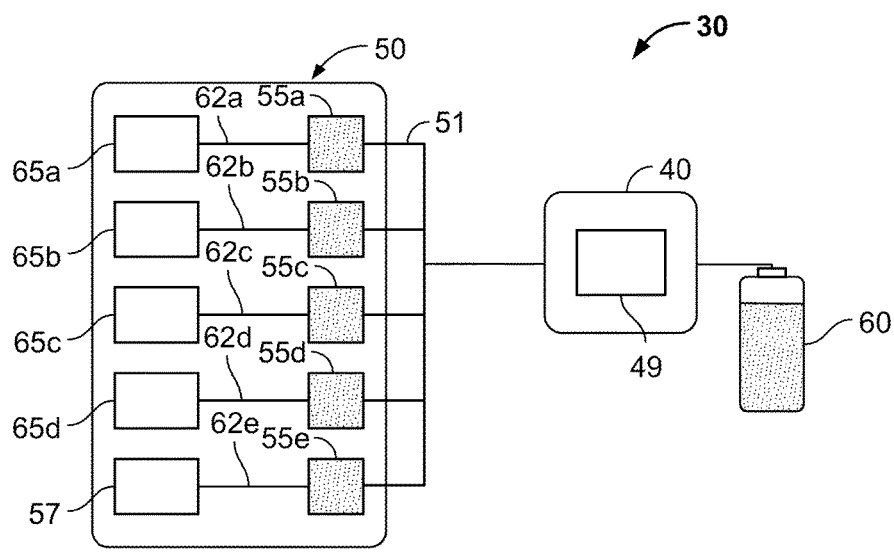
FIGS. 3 and 4 show illustrative embodiments of a multi-stage voltage regulator and an integrated circuit having a multi-stage voltage regulator in accordance with some embodiments.
Figure 2:
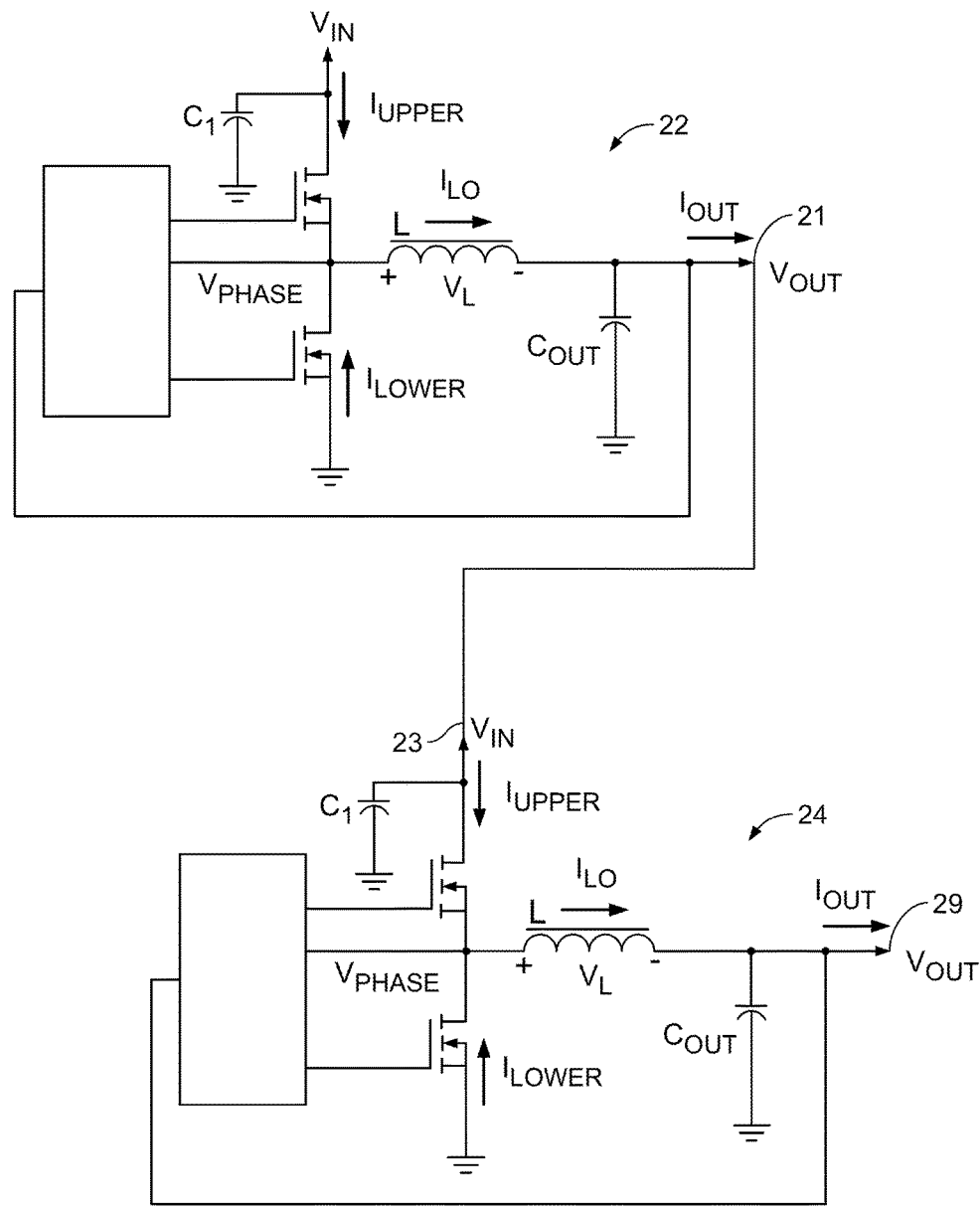
FIG. 2 shows an illustrative embodiment of a multi-stage converter in accordance with the prior art.
Figure 4:
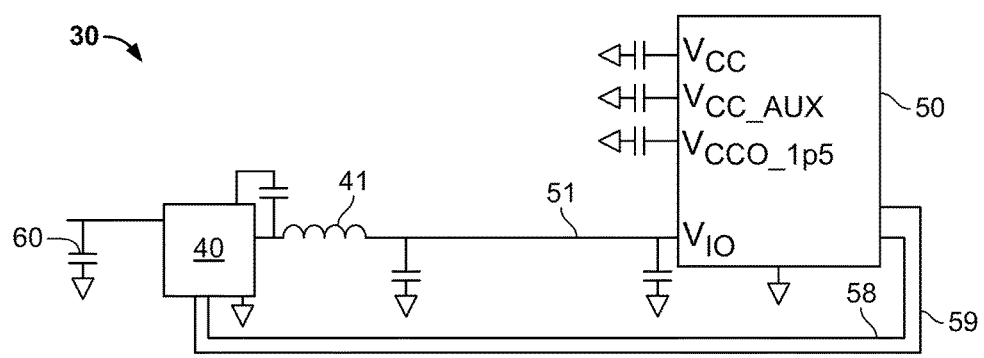

Exemplary embodiments of multi-stage DC to DC voltage regulators (or converters) 30 are shown in FIG. 3 and FIG. 4, respectively. The multi-stage regulator 30 may include a first, off-chip voltage regulation stage 40 and a second, on-chip voltage regulation stage 50. The first voltage regulation stage 40 and the second voltage regulation stage 50 may each include one or more voltage regulators of any suitable type arranged in any suitable topology, including, without limitation, linear regulators, switching regulators, buck converters, boost converters, buck-boost converters, switched-capacitor converters, switched-capacitor hybrid converters, and/or any other circuits suitable for performing DC-to-DC level conversion and/or voltage regulation. In some embodiments, the first voltage regulation stage 40 and the second voltage regulation stage 50 include different numbers of voltage regulators, different types of voltage regulators, and/or different arrangements of voltage regulators. As just one example, the first voltage regulation stage 40 may include a buck converter, and the second voltage regulation stage may include one or more voltage regulation devices each comprising a linear regulator and/or a buck converter.

The first, off-chip stage 40 may be disposed external to a chip (e.g., an IC or SoC), while the second stage may be integrated into the chip. The off-chip stage 40 may perform voltage regulation on a signal provided by a power source 60 to provide an intermediate output voltage 41. The first, off-chip stage 40 and the second, on-chip stage 50 are in communication (e.g., electrical communication, electromagnetic communication, etc.) such that the voltage input 51 to the second, on-chip voltage regulation stage 50 depends on the output voltage 41 from the first, off-chip voltage regulation stage 40. In some embodiments, the first, off-chip voltage regulation stage 40 includes a voltage regulator 49, and the second, on-chip voltage regulation stage 50 includes one or more voltage regulator(s) 55. The voltage regulator(s) 55 may provide output voltage(s) 62 to corresponding load(s) 65. Each load 65 may comprise any suitable circuit and/or device, including, without limitation, digital and/or analog circuitry implementing a function, a radio-frequency (RF) circuit, micro-processor, micro-processor core, micro-controller, field-programmable gate array (FPGA), digital application-specific integrated circuit (ASIC), memory, and/or any other circuit powered by a substantially DC voltage.

The first, off-chip stage 40 and the second, on-chip stage 50 may communicate with each other via one or more communication lines (58, 59). In some embodiments, based on such communication, the on-chip stage 50 determines whether the off-chip stage 40 is a suitable component of a multi-stage converter 30. In some embodiments, the on-chip stage 50 determines the suitability of the off-chip stage 40 based, at least in part, on an authentication protocol. In some embodiments, the authentication protocol involves a handshake between the off-chip stage 40 and the on-chip stage 50. In some embodiments, the authentication protocol involves the off-chip stage 40 providing authentication data (e.g., one or more security tokens, security credentials, any data suitable for identifying the off-chip stage 40 and/or for determining the authenticity of off-chip stage 40, etc.) to the on-chip stage 50, and the on-chip stage 50 attempting to verify the authentication data. In some embodiments, the authentication data and/or some or all of the communications that implement the authentication protocol may be encrypted. If the on-chip stage 50 is unable to verify the authenticity of the off-chip stage 40, the on-chip stage 50 may determine that the off-chip stage 40 is not a suitable component of a multi-stage converter 30. An off-chip stage 40 may be referred to as "authentic" if the on-chip stage 50 has verified the authenticity of the off-chip stage 40, and/or if the off-chip stage 40 is capable of successfully completing the authentication protocol.

In some embodiments, the off-chip stage 40 implements a "handoff" functionality whereby the on-chip stage 50 may control the voltage regulator 49 of the off-chip stage 40 to regulate the intermediate voltage provided to on-chip stage 50 by off-chip stage 40. In some embodiments, the off-chip stage 40 may transmit a signal (e.g., a secure "enable signal") to the on-chip stage 50, thereby indicating that the off-chip stage 40 is ready for the on-chip stage 50 to take control of voltage regulator 49. The on-chip stage 50 may communicate with the off-chip stage 40 via the communication line(s) (58, 59) to control voltage regulator 49. In some embodiments, on-chip stage 50 may determine whether it has successfully taken control of voltage regulator 49 based, at least in part, on the intermediate voltage signals provided by off-chip stage 40 in response to control signals provided by on-chip stage 50. If the off-chip stage 40 does not implement the above-described "handoff" functionality (e.g., does not transmit a suitable "enable signal", and/or does not respond as expected to the on-chip stage's control signals), the on-chip stage 50 may determine that the off-chip stage 40 is not a suitable component of a multi-stage converter 30. In some embodiments, the on-chip stage 50 determines whether the off-chip stage 40 is suitable based, at least in part, on whether the off-chip stage 40 implements the handoff functionality, and/or whether the on-chip stage 50 is able to successfully take control of voltage regulator 49. Additionally and/or in the alternative, the on-chip stage 50 may determine whether the off-chip stage 40 is suitable based, at least in part, on an authentication protocol.

If the on-chip stage 50 determines that the off-chip stage 40 is unsuitable (e.g. if the on-chip stage 50 fails to authenticate the off-chip stage 40, and/or fails to take control of the off-chip stage 40), the on-chip stage 50 may disable the voltage regulator(s) 55, the off-chip stage 40, and/or the off-chip voltage regulator 49. When any or all of these components are disabled, the voltage regulator(s) 55 may not perform DC-to-DC voltage regulation, and/or may not provide regulated voltage signal(s) 62 to the corresponding load(s) 65. Disabling the voltage regulator(s) 55 may comprise de-activating the voltage regulator(s) 55 (e.g., terminating DC-to-DC voltage regulation by the voltage regulator(s)), preventing activation of the voltage regulator(s) 55 (e.g., preventing the voltage regulator(s) 55 from initiating DC-to-DC voltage regulation), adapting the voltage regulator(s) 55 to output signal(s) other than the regulated voltage signal(s), and/or any other act that results in the voltage regulator(s) failing to provide the expected voltage level(s) to the load(s) 65. By contrast, if the on-chip stage 50 determines that the off-chip stage 40 is suitable (e.g., if the on-chip stage 50 authenticates the off-chip stage 40 and/or takes control of the off-chip stage 40), the on-chip stage 50 may enable the voltage regulator(s) 55 to perform voltage regulation on the intermediate voltage provided by the first, off-chip stage 40, and to provide the regulated voltage signal(s) 62 to the corresponding load(s) 65.

The on-chip stage 50 may include a master controller 57. In some embodiments, the master controller 57 handles communication between the on-chip stage 50 and the off-chip stage 40 on behalf of the on-chip stage 50. For example, the master controller 57 may handle communication relating to authenticating off-chip stage 40, communication relating to handing off control of off-chip stage 40 to on-chip stage 50, and/or communication relating to on-chip stage 50 controlling voltage regulator 49. In some embodiments, the on-chip stage's master controller 57 may communicate with a regulator controller and/or communication circuitry associated with off-chip stage 40, which may handle communication between the off-chip stage 40 and the on-chip stage 50 on behalf of the off-chip stage 40. Regulator controllers and communication circuitry for off-chip stage 40 are described in further detail below.

In some embodiments, off-chip stage 40 includes a controller operable to control voltage regulator 49 (e.g., to control the drivers and power FETs of voltage regulator 49 in embodiments where voltage regulator 49 comprises a switching regulator). For the embodiments in which voltage regulator 49 of the off-chip stage 40 can be controlled by the on-chip stage 50, the off-chip controller may perform a bootstrapping function. In particular, the off-chip controller may control voltage regulator 49 to provide power to the on-chip stage 50 or portions thereof, including master controller 57. When sufficient power is provided by voltage regulator 49, master controller 57 may take control of voltage regulator 49 and/or the off-chip controller. In some embodiments, when master controller 57 takes control of voltage regulator 49, the master controller bypasses the off-chip controller. Alternatively, when master controller 57 takes control of voltage regulator 49, the master controller also takes control of the off-chip controller, and uses the off-chip controller to assist in the process of controlling voltage regulator 49. The latter approach may reduce the size, cost, and/or complexity of the master controller 57. In some embodiments, the on-chip stage 50 comprises a sensing circuit that senses a level of the intermediate voltage supplied by the off-chip stage 40, and determines whether the intermediate voltage level is sufficient for the master controller 57 to control the voltage regulator 49 and/or off-chip controller to regulate the intermediate voltage. The sufficient voltage level may depend on process-specific, chip-specific, and/or application-specific parameters, and may be provided as inputs to the sensing circuit.

In some embodiments, the above-described process of handing off control of voltage regulator 49 to on-chip stage 50 may involve communication (e.g., completion of a handshaking protocol) between master controller 57 and the off-chip controller. In some embodiments, the same communication line(s) (58, 59) may be used for determining whether off-chip stage 40 is a suitable component of multi-stage voltage regulator 30 (e.g., for authentication), for handing off control of voltage regulator 49 to on-chip stage 50 (e.g., for handshaking), and/or for master controller 57 to control voltage regulator 49. In some embodiments, the communication for handing off control of voltage regulator 49 may follow a standard protocol for controlling power stages, while in others the signals could be inverted or encoded.

Figure 5A:
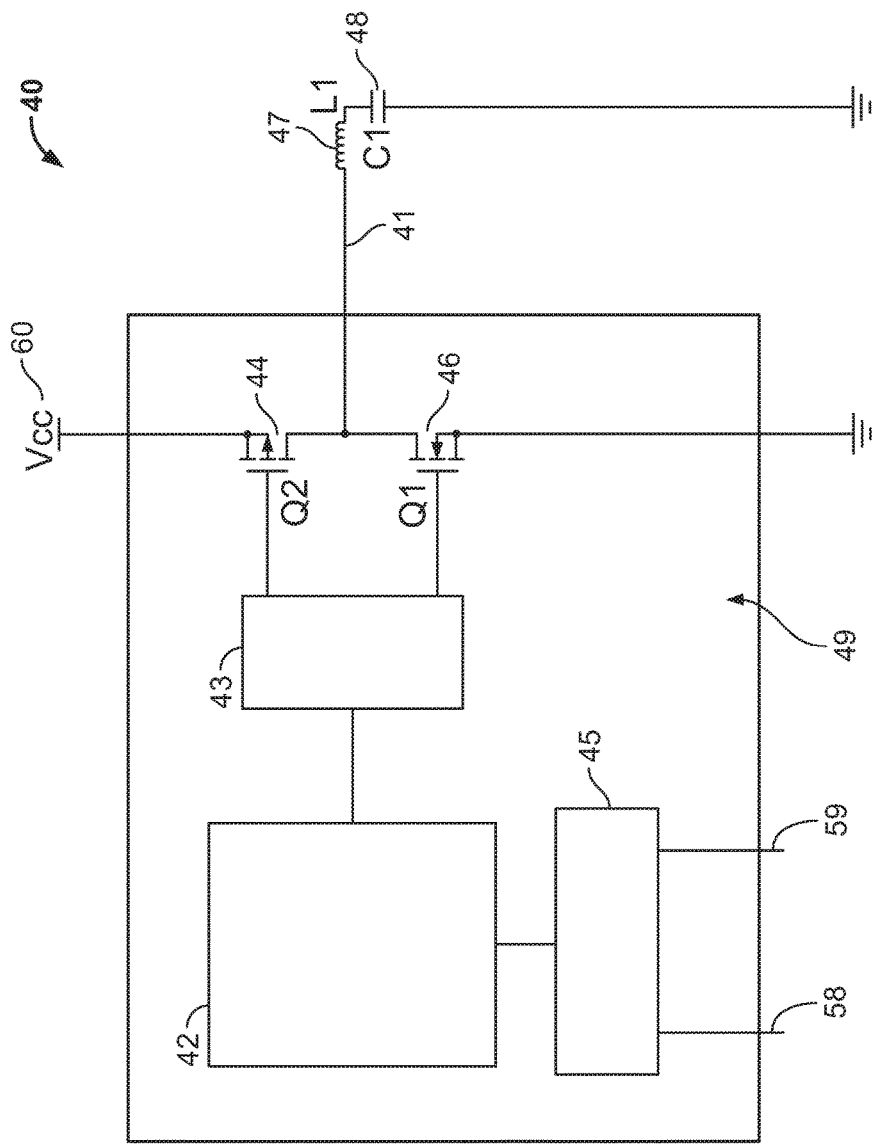
FIGS. 5A and 5B show illustrative embodiments of a first voltage regulation stage of a multi-stage voltage regulator in accordance with some embodiments.
Figure 5B:
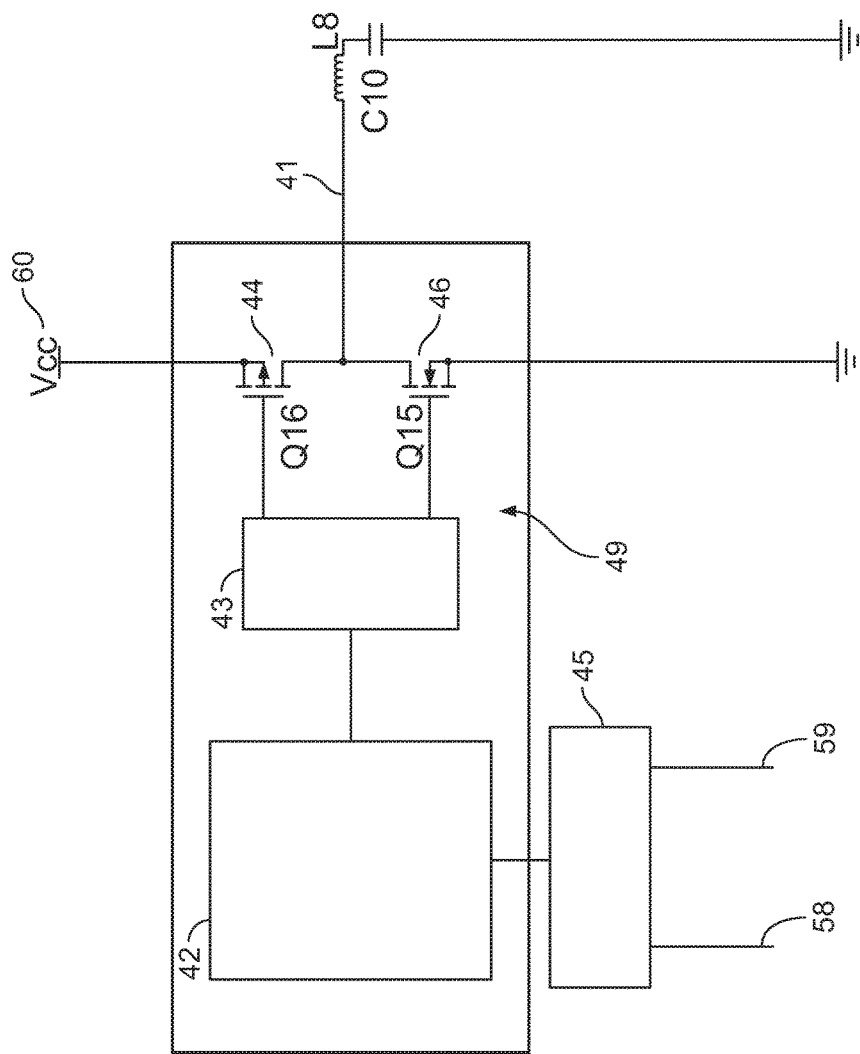
Figure 5C:
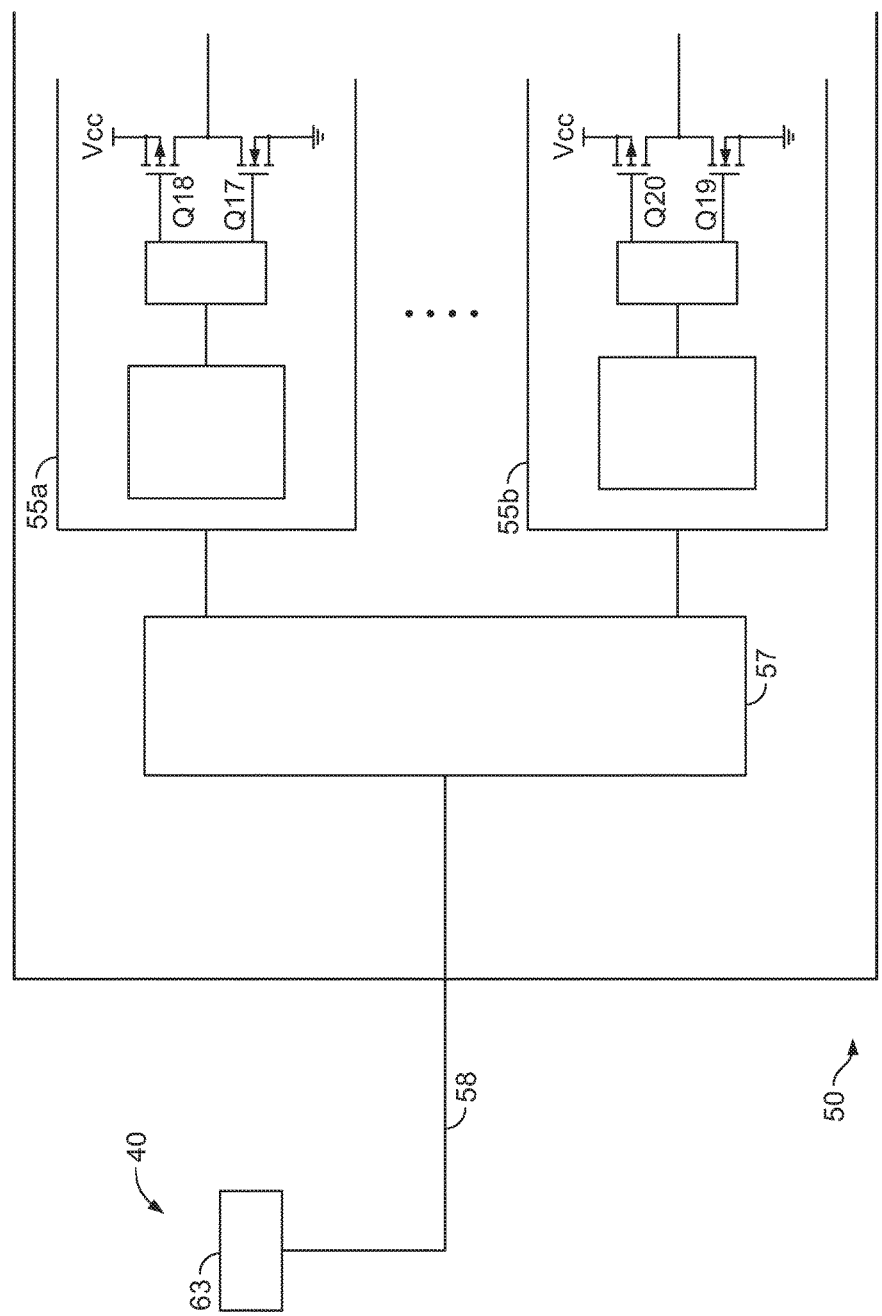
FIG. 5C shows an illustrative embodiment of an external chip used in lieu of a first voltage regulation stage in accordance with some embodiments.

Referring to FIGS. 5A, 5B, and 5C, various embodiments of a first, off-chip stage 40 are shown. The first, off-chip stage 40 is coupled to a power source 60 and includes a controller 42 and at least one first voltage regulator 49. In some embodiments, first voltage regulator 49 comprises a driver 43 and at least one switching device, e.g., a field-effect transistor(s) (FET) 44, 46. For illustrative purposes only, the first voltage regulator 49 may comprise a buck converter that converts a 3.6V DC input voltage to an output voltage 41 that is filtered, e.g., using a filter comprising an inductor(s) 47 and capacitor(s) 48, to produce a DC or substantially DC output voltage 41. The output voltage 41 may be supplied to on-chip stage 50 as the input voltage 51 to the on-chip stage. In some embodiments, first voltage regulator 49 comprises a buck converter, switching regulator, linear regulator, hybrid buck converter, switched-capacitor converter, switched-capacitor hybrid converter, and/or any other circuit suitable for performing DC-to-DC level conversion and/or voltage regulation.

In some embodiments, off-chip stage 40 also includes communication circuitry 45 that is in communication with the first stage controller 42 and a master controller 57 of the second, on-chip stage. Although this description describes a master controller 57 as a separate device, those of ordinary skill in the art can appreciate that a single controller may perform all or substantially all of the "controller" functions of first stage controller 42 and master controller 57, or that first stage controller 42 and master controller 57 may be separate elements. Communication circuitry 45 may or may not be combined physically with the first stage controller 42.

The master controller 57 is adapted to generate and transmit signals for controlling first voltage regulator 49 via communication line(s) (58, 59). These signals may include "handoff signals" (e.g., signals that form part of a protocol for handing off control of first voltage regulator 49), and/or "control signals" (e.g., signals that control the operation of first voltage regulator 49, including, but not limited to, signals that control the switching of the power FETs 44, 46). In some embodiments, the communication circuitry 45 receives the handoff signals and/or control signals, and relays those signals to the first stage controller 42. As will be discussed in greater detail below, the handoff signal(s) may form part of a handoff protocol whereby the second stage 50 takes control of the first voltage regulator 49 to regulate the intermediate voltage provided by first stage 40.

In some embodiments, the handoff signal(s) can be bidirectional and may be used to determine whether the first stage controller 42 is a suitable controller for the off-chip stage 40 of a multi-stage voltage regulator 30. In some embodiments, if the first stage controller 42 is not a suitable controller for the off-chip stage of a multi-stage voltage regulator 30, one or more of the voltage regulators 55 in the second stage 40 either do not start up at all or shut down shortly after the first stage controller 42 is determined to be unsuitable. In short, advantageously, the handoff signal(s) may be used to implement a protocol whereby the second stage 50 does not turn on or turns off shortly after turning on if a suitable first stage 40 is not being used. After receiving the handoff signal(s) from the master controller 57, the first stage controller 42 may no longer control voltage regulator 49 (e.g., no longer regulate the duty cycle of the power FETs 44, 46); rather, control signals (e.g., pulse-width modulated control signals) from the master controller 57 may control voltage regulator 49 (e.g., regulate the duty cycle of the power FETs 44, 46).

FIG. 5A shows one variation of a system in which the communication circuitry 45 is disposed on the same chip as the driver 43, first voltage regulator 49, and first stage controller 42. In the alternate, as shown in FIG. 5B, the communication circuitry 45 can be disposed off the chip on which the driver 43, first voltage regulator 49, and first stage controller 42 are integrated. With this variation a separate chip communicates with the master controller 57 associated with on-chip stage 50. In still another variation, as shown in FIG. 5C, an off chip stage 40 may comprise a control chip 63 that, while not providing any voltage regulation or control, can be used to prevent the second stage 50 from starting up at all and/or to stay voltage regulation at the second stage 50. Were the control chip 63 and/or a suitable first stage 40 absent, one or more of the second voltage regulators 55 either would not start up at all or would shortly shut down. Furthermore, with the use of the external control chip 63, there may or may not be a first, off-chip stage 40 of voltage regulation in the multi-stage voltage regulator 30. Without a first, off-chip stage 40, what has been termed the second, on-chip stage 50 would be the only conversion from the input to the chip and the discrete voltage domains. Regardless, in this embodiment, the discrete voltage domains will not be powered without a control chip 63 and proper communication between them. The control chip 63 may have other circuitry unrelated to voltage regulation or this aspect of voltage regulation.

Turning now to the second stage 50, in some embodiments, secondary voltage regulation may be structured and arranged in a multi-core design that includes a plurality of on-chip voltage regulators 55a-55e (FIG. 3) that are partitioned to implement multiple voltage domains on a single SoC. Although the voltage regulator 30 will be described assuming that the first stage 40 cascades into a single secondary stage 50 and, moreover, that the single secondary stage 50 includes only two voltage domains, e.g., a high voltage domain and a low voltage domain, some embodiments of the voltage regulator 30 are not so limited.

With such a design, referring to FIG. 3 and FIGS. 6A-6C, on-chip voltage regulator 50 may provide, for example, a number of separate voltage domains and output voltages 62a, 62b. Preferably, discrete voltage domains and output voltages 62a, 62b may be controlled, e.g., by on-chip driver circuitry (e.g., driver 53) and/or an on-chip controller 52, to satisfy discrete power specifications for circuits or devices (e.g., discrete loads) disposed on the SoC. For that purpose, on-chip voltage regulator 50 includes at least one and, preferably more than one integrated voltage regulators 55, each of which may be in electrical communication with a corresponding load 65 (FIG. 3) integrated onto the chip (e.g., multi-core SoC). In some embodiments, the voltage regulator(s) 55 may be in communication with a "master" controller 57. The master controller 57 and integrated voltage regulator(s) 55 may provide per-core voltage control. For illustrative purposes only, on-chip stage 50 may provide bucking of a 2V input voltage 51 to a myriad of desired final output voltages 62a-62e (e.g., 1.1V, 0.8V, 1V, 0.5V, and 1V). Those of ordinary skill in the art can appreciate that the final output voltages 62-62e are exemplary only and, moreover, that the number and magnitude of actual output voltages would depend on the discrete load(s) being powered and the number of on-chip integrated voltage regulators 55a-55e.

To enhance the performance of the system and/or to facilitate faster implementation of a design in multiple SOCs, which may be on different process nodes, implementing the second stage of the voltage regulator as well as control circuitry on more than one oxide can be advantageous. A designer can choose the oxide for the functions based on performance or design portability. For example the thickest oxide can withstand higher input voltages, however, it may not provide the best performance. Also, as processes migrate to finer geometries, design can be complicated by aspects of those processes. Thus, it may be easier for the design to be done and/or ported in a thicker oxide. More specifically, to provide multiple voltage domains on the SoC, each of the integrated voltage converters 55, and more particularly the switching devices 54, 56 operationally controlled by those voltage converters 55, may be disposed on the SoC on an oxide layer having a different thickness than any other oxide layer. Switching devices 44, 46 disposed on thicker oxide layers are generally slower than switching devices disposed on thinner oxide layers but can generally withstand higher voltages. As a result, switching devices 44, 46 on thicker oxide layers generally may be used in connection with relatively higher, more linear operating voltages that, hence, exhibit higher conversion loss. Thus, conventionally, switching devices 44, 46 on thicker oxide layers are more efficiently used for on/off (I/O) functions. Devices on thinner oxide layers, which exhibit lower conversion loss, e.g., via lower parasitic resistance and capacitance, may have lower operating voltages and, as a result, can be used for higher frequency switching.

Advantageously, a plurality of capacitors 64 each of which is electrically coupled to a corresponding load 65 that is integrated on the SoC may be disposed external to the SoC, e.g., on the board or in the package. In another implementation, there may be no capacitance off the SoC.

Figure 6A:
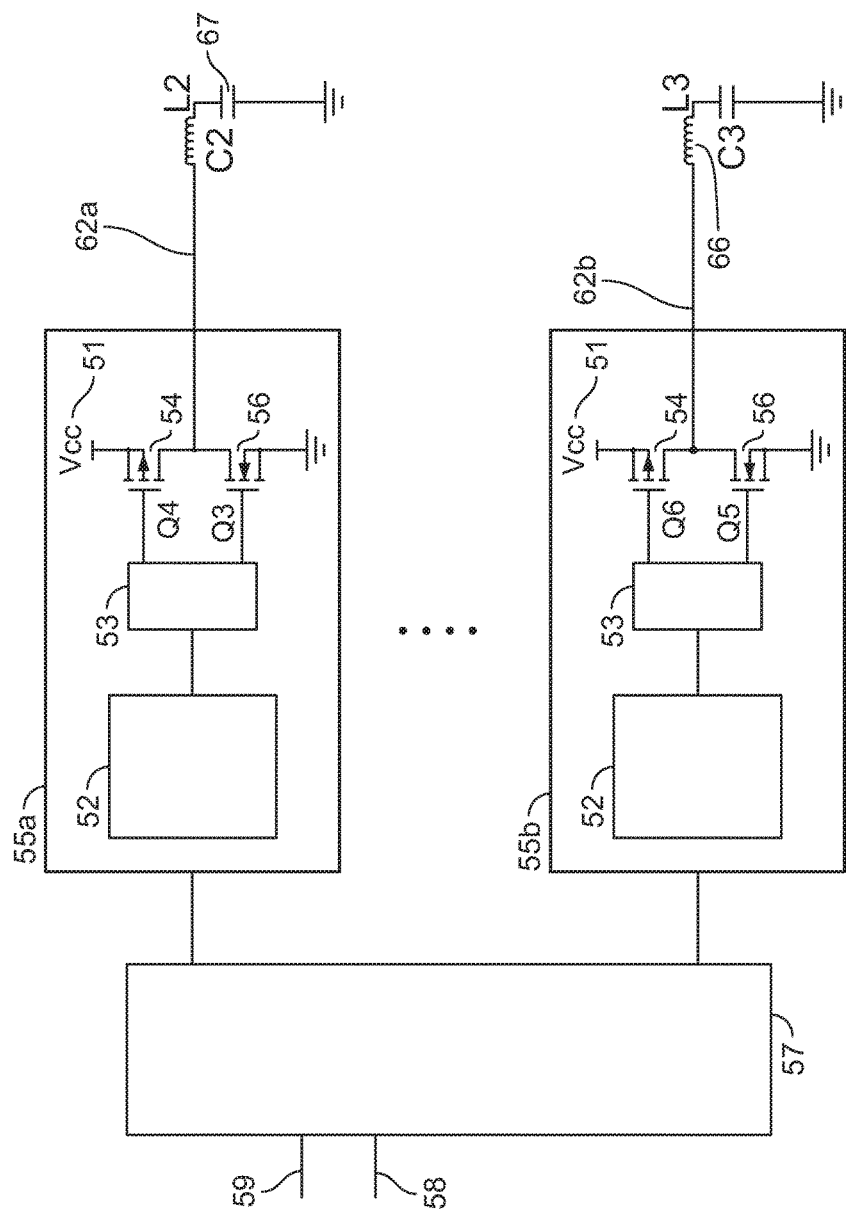
FIGS. 6A, 6B, and 6C show illustrative embodiments of a second voltage regulation stage of a multi-stage voltage regulator in accordance with some embodiments.
Figure 6B:
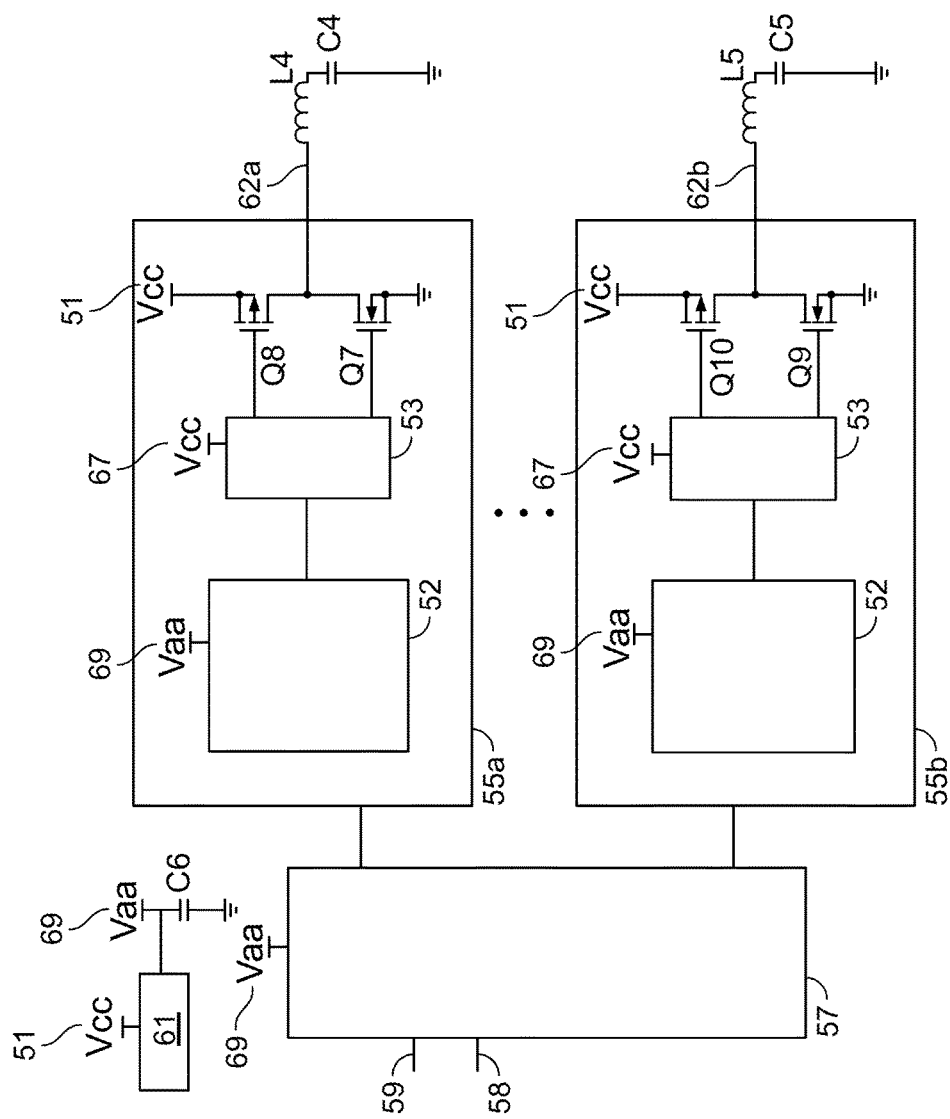
Figure 6C:
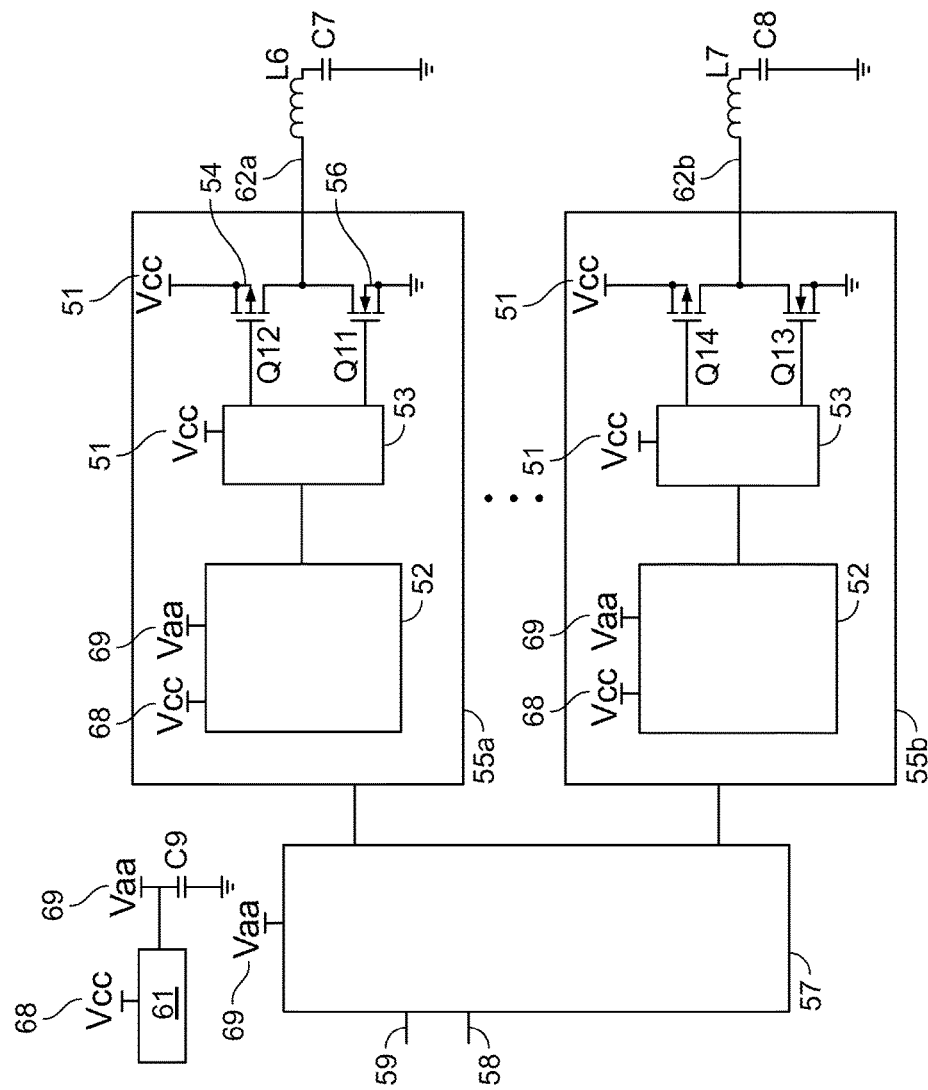

FIGS. 6A-6C show various implementations of some embodiments for secondary voltage regulation. FIG. 6A shows an implementation in which the output voltage 41 provided by the first stage 40 is provided as a power input 51 to the voltage regulator(s) 55 (e.g., as the power supply rail for first power switching device 54). The embodiment in FIG. 6B differs from the embodiment in FIG. 6A in that the output voltage 41 from the first stage 40 also becomes input 67 into the on-chip controller 52 and driver 53. In addition, the output voltage 62a, 62b from the second stage 50 can be fed back to the master controller 57 and/or the on-chip controller 52 as feedback 69, which can be used to refine the regulation of the intermediate voltage 41 and the desired output voltages 62a, 62b. The embodiment of FIG. 6C differs from the embodiment in FIG. 6B in that the output voltage 41 from the first stage 40 may also become input 69 into the on-chip controller 52 and/or the master controller 57. Indeed, advantageously, the output voltage 41 from the first stage 40 may be used as input to power any circuit or device disposed on the SoC.

In other variations, secondary voltage regulation may include sensing circuitry that is adapted to sense a characteristic of the first stage 40. Examples of such characteristics may include a measurement of current associated with the first voltage regulator 49, an estimation of current associated with the first voltage regulator 49, a duty cycle associated with the power FETs 34, 36 of the first voltage regulator 49, and so forth. One function of the sensing circuitry may be to ascertain when at least one of the secondary voltage regulators 55 in the second stage 50 has enough voltage (or power) to operate and, moreover, to assume control of the power FETs 34, 36 of the first voltage regulator 49 for the purpose of regulating the intermediate voltage output 41 by the first stage 40. Referring to FIG. 6B, a start-up voltage regulator 61 is shown that receives as input 51 the voltage output 41 from the first stage 40. This start-up voltage regulator 61, which may be integrated on the chip or die, may be adapted to convert, e.g., buck or boost, the voltage input 51 using a thinner oxide layer and, hence, a lower voltage. In turn, the voltage output 69 from the start-up voltage regulator 61 can be input into any of the master controller 57, regulator controllers 52, driver 53, and so forth.

Once a mid-rail regulator or other sensing device senses that it has enough head room to operate, the sensing device may signal the master controller 57 to generate handoff signals. The generated handoff signals may be transmitted to the communication circuitry 45 of the first stage 40. The effect of the handoff signals may be to implement a communication "handshake," to alert the first stage controller 42 that the master controller 57 is powered sufficiently to assume control over the first stage controller 42 and, moreover, that, henceforth, the master controller 57 will send control signals to the first stage 40 to control the first voltage regulator 49. Accordingly, after the handoff, the master controller 57 of the second voltage regulation stage 50 may control the first voltage regulator 49 of the first stage 40 (e.g., the duty cycle of the power FETs 34, 36 of the first voltage regulator 49).

Some embodiments have been described in which all components of on-chip stage 50 are on-chip with the load(s) 65 powered by the output(s) of the voltage regulator(s) 55. In some embodiments, some components of on-chip stage 50 may be on-chip with the load(s), and other components may be off-chip. For example, in some embodiments the voltage regulator(s) 55 may be on-chip with their respective load(s) 65, and any other component of on-chip stage 50 may be on-chip or off-chip.

In some embodiments, master controller 57 and voltage regulator(s) 55 may be separate components, and in some embodiments, master controller 57 and voltage regulator(s) 55 (or portions thereof) may be integrated together. For example, in some embodiments master controller 57 and controller(s) 52 may be integrated together.

Having described an embodiment of a multi-stage DC-DC voltage regulator 30 and an integrated circuit having such a multi-stage voltage regulator 30, a method of regulating voltage on an integrated circuit having a plurality of circuits and devices 55a-55d (e.g., loads) integrated onto a SoC will now be described. In some embodiments, a method of regulating voltage to at least one load on an integrated circuit, wherein each load operates in a different voltage domain, includes providing at startup an intermediate voltage via a first voltage regulator that is not disposed on the integrated circuit; converting the intermediate voltage to a desired voltage for a corresponding voltage domain using at least one second voltage regulator disposed on the integrated circuit; sensing when there is sufficient voltage for a master controller disposed on the integrated circuit to control the first voltage regulator that is not disposed on the integrated circuit; and controlling the first voltage regulator to regulate the intermediate voltage using the master controller disposed on the integrated circuit. Although in describing the method, the steps are presented in a specific order, in actual implementation the order of the steps may be changed.

In some embodiments, the first voltage regulator powers the second voltage regulator(s) until the master controller associated with the second voltage regulator(s) has sufficient power to control the duty cycle of the first voltage regulator. Thus, controlling the first voltage regulator to regulate the intermediate voltage may include providing an enable signal to the first voltage regulator to signal the first voltage regulator that the controller disposed on the integrated circuit is controlling the first voltage regulator. Such a handoff, which occurs at some time after start up, transfers control of the switching, which is to say, for example, pulse width management and the on and off times of the switching devices, from the first voltage regulator to the second voltage regulator(s). Controlling the first voltage regulator may include using a measurement of an electrical characteristic (e.g., a current in the first voltage regulator), an estimated value of an electrical characteristic (e.g., a current in the first voltage regulator), and/or timing information of switching devices in the first voltage regulator as indicia to control the first voltage regulator and to regulate the intermediate voltage.

The method may also include performing dynamic voltage scaling on at least one circuit or discrete load disposed on the integrated circuit and adjusting an output voltage in response to a measurement of temperature and/or a measurement of current.

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

Various embodiments and features of the present invention have been described in detail with particularity. The utilities thereof can be appreciated by those skilled in the art. It should be emphasized that the above-described embodiments of the present invention merely describe certain examples implementing the invention, including the best mode, in order to set forth a clear understanding of the principles of the invention. Numerous changes, variations, and modifications can be made to the embodiments described herein and the underlying concepts, without departing from the spirit and scope of the principles of the invention. All such variations and modifications are intended to be included within the scope of the present invention, as set forth herein. The scope of the present invention is to be defined by the claims, rather than limited by the forgoing description of various preferred and alternative embodiments. Accordingly, what is desired to be secured by Letters Patent is the invention as defined and differentiated in the claims, and all equivalents.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A voltage regulation system comprising:
an upstream voltage regulation device disposed external to an integrated circuit (IC), the upstream voltage regulation device comprising communication circuitry;
a downstream DC-to-DC voltage regulation device disposed on the IC and coupled to the upstream voltage regulation device, the downstream voltage regulation device comprising one or more downstream voltage regulation modules and a downstream controller configured to control the downstream voltage regulation modules; and one or more loads disposed on the IC, the one or more loads implemented in one or more respective voltage domains and coupled to the downstream voltage regulation device, wherein the upstream voltage regulation device is configured to supply one or more intermediate voltages as input to the downstream voltage regulation modules of the downstream voltage regulation device, wherein the downstream voltage regulation modules are configured to supply one or more voltage levels, respectively, to the one or more loads, wherein the communication circuitry of the upstream voltage regulation device is configured to communicate with the downstream controller of the downstream voltage regulation device, and wherein the downstream controller is further configured to:
receive encrypted authentication data from the communication circuitry of the upstream voltage regulation device,
determine, based on the authentication data, whether the upstream voltage regulation device is authentic, and
directly disable at least one of the downstream voltage regulation modules if the downstream controller determines that the upstream voltage regulation device is not authentic.

2. The voltage regulation system of claim 1, wherein the downstream controller is further configured to enable at least one of the downstream voltage regulation modules if the downstream controller determines that the upstream voltage regulation device is authentic.

3. The voltage regulation system of claim 1, wherein the downstream controller is further configured to disable at least one of the downstream voltage regulation modules within a predetermined time after startup of the downstream voltage regulation device unless the downstream controller determines that the upstream voltage regulation device is authentic prior to the predetermined time.

4. The voltage regulation system of claim 1, wherein the upstream voltage regulation device further comprises:
one or more upstream voltage regulation modules configured to supply the intermediate voltages; and
an upstream controller configured to control operation of the upstream voltage regulation modules during a bootstrap phase of operation, thereby controlling respective voltage levels of the intermediate voltages during the bootstrap phase.

5. The voltage regulation system of claim 4, wherein the downstream controller is further configured to take control of the operation of the upstream voltage regulation modules from the upstream controller.

6. The voltage regulation system of claim 4, wherein the downstream controller is further configured to:
attempt to take control of the operation of the upstream voltage regulation modules from the upstream controller; and
disable at least one of the downstream voltage regulation modules if the downstream controller fails to take control of the operation of the upstream voltage regulation modules.

7. The voltage regulation system of claim 4, wherein the one or more intermediate voltages supplied by the upstream voltage regulation modules of the upstream voltage regulation device provide power to the downstream controller.

8. The system of claim 4, wherein the downstream controller is further configured to indirectly disable at least one of the downstream voltage regulation modules by disabling the upstream voltage regulation modules of the upstream voltage regulation device.

9. The system of claim 1, wherein the authentication data encode authentication information including one or more security tokens, one or more security credentials, and/or data identifying the upstream voltage regulation device, and wherein the downstream controller is configured to determine, based on the authentication information, whether the upstream voltage regulation device is authentic.

10. The system of claim 1, wherein directly disabling the downstream voltage regulation module comprises disabling the downstream voltage regulation module within a predetermined time after startup of the downstream voltage regulation device.

11. An apparatus comprising:
a downstream DC-to-DC voltage regulation device disposed on an integrated circuit (IC) and coupled to an upstream voltage regulation device disposed external to the IC, the downstream voltage regulation device including:
one or ore downstream voltage regulation modules configured to supply one or more voltage levels, respectively, to one or more loads disposed on the IC and implemented in one or more respective voltage domains, and
a downstream controller configured to control the downstream voltage regulation modules,
wherein the upstream voltage regulation device is configured to supply one or more intermediate voltages as input to the downstream voltage regulation modules, and
wherein the downstream controller is further configured to:
receive encrypted authentication data from communication circuitry of the upstream voltage regulation device,
determine, based on the authentication data, whether the upstream voltage regulation device is authentic, and
directly disable at least one of the downstream voltage regulation modules if the downstream controller determines that the upstream voltage regulation device is not authentic.

12. The apparatus of claim 11, wherein the downstream controller is further configured to enable at least one of the downstream voltage regulation modules if the downstream controller determines that the upstream voltage regulation device is authentic.

13. The apparatus of claim 11, wherein the downstream controller is further configured to disable at least one of the downstream voltage regulation modules within a predetermined time after startup of the downstream voltage regulation device unless the downstream controller determines that the upstream voltage regulation device is authentic prior to the predetermined time.

14. The apparatus of claim 11, wherein the upstream voltage regulation device comprises:
one or more upstream voltage regulation modules configured to supply the one or more intermediate voltages; and
an upstream controller configured to control operation of the upstream voltage regulation modules during a bootstrap phase of operation, thereby controlling respective voltage levels of the intermediate voltages during the bootstrap phase.

15. The apparatus of claim 14, wherein the downstream controller is further configured to take control of the operation of the upstream voltage regulation modules from the upstream controller.

16. The apparatus of claim 14, wherein the downstream controller is further configured to:
   attempt to take control of the operation of the upstream voltage regulation modules from the upstream controller; and
   disable at least one of the downstream voltage regulation modules if the downstream controller fails to take control of the operation of the upstream voltage regulation modules.

17. The apparatus of claim 14, wherein the downstream controller is further configured to indirectly disable at least one of the downstream voltage regulation modules by disabling the upstream voltage regulation modules of the upstream voltage regulation device.

18. The apparatus of claim 11, wherein the authentication data encode authentication information including one or more security tokens, one or more security credentials, and/or data identifying the upstream voltage regulation device, and wherein the downstream controller is configured to determine, based on the authentication information, whether the upstream voltage regulation device is authentic.

19. The apparatus of claim 11, wherein directly disabling the downstream voltage regulation module comprises disabling the downstream voltage regulation module within a predetermined time after startup of the downstream voltage regulation device.

* * * * *